April 30, 1929.  J. TRIULZI  1,711,187
UNIVERSAL JOINT
Filed Nov. 1, 1926  2 Sheets-Sheet 2

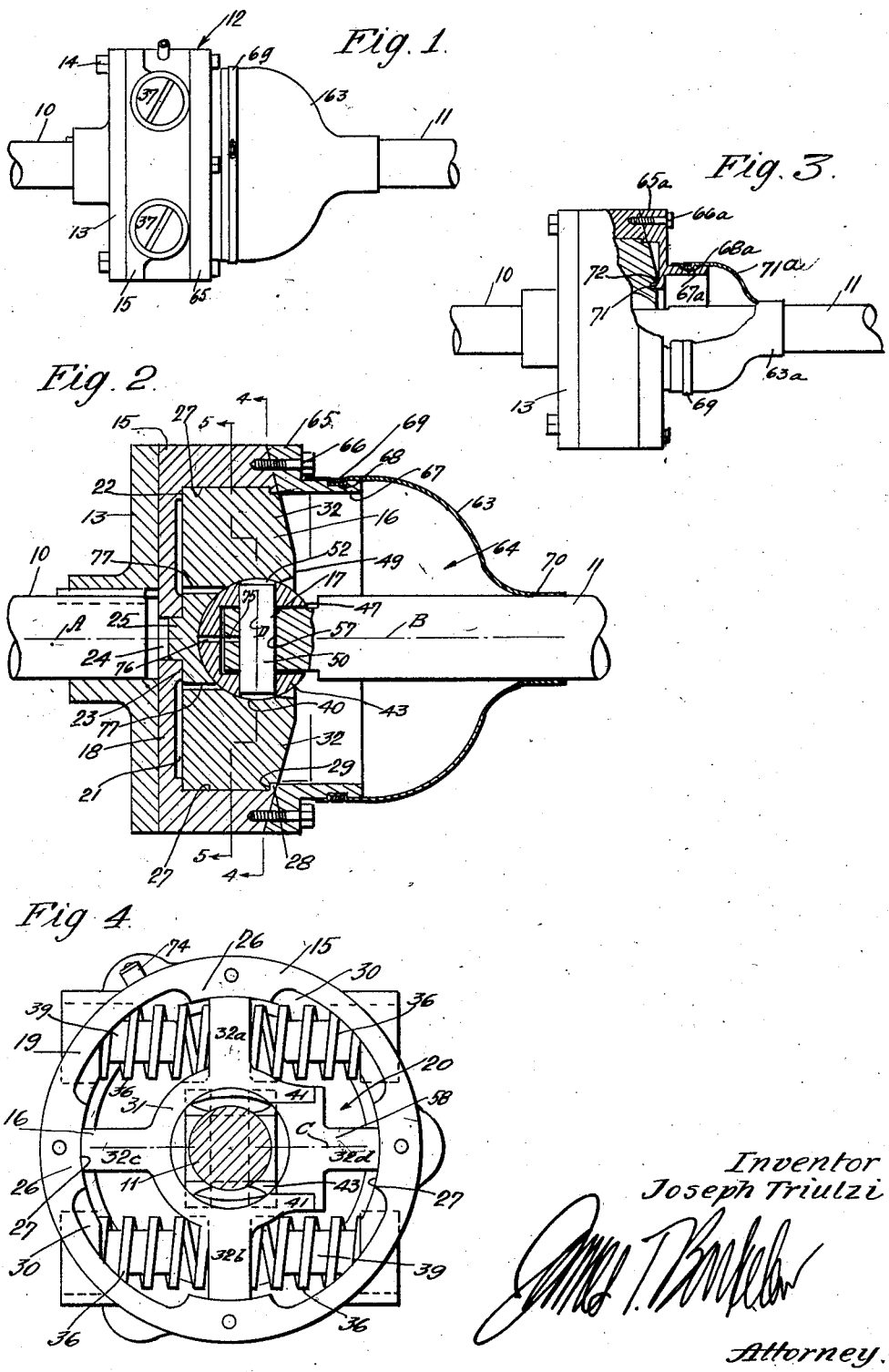

Inventor.
Joseph Triulzi

Attorney.

Patented Apr. 30, 1929.

1,711,187

UNITED STATES PATENT OFFICE.

JOSEPH TRIULZI, OF LOS ANGELES, CALIFORNIA, ASSIGNOR TO BRALY MANUFACTURING COMPANY, OF LOS ANGELES, CALIFORNIA, A CORPORATION OF CALIFORNIA.

UNIVERSAL JOINT.

Application filed November 1, 1926. Serial No. 145,614.

This invention has to do generally with shaft couplings, and is more particularly concerned with couplings of the universal type wherein resilient connection is provided between coupling elements.

The general utility and advantages of this type of coupling are well understood, and therefore need not be discussed in detail here, though it may be said briefly that such couplings have characteristics which allow the transmission of power from one shaft to another with a cushioning effect to absorb the shocks and strains of sudden stopping and starting and to maintain a proper driving relation between shafts when they are out of axial alinement. In my device, the means for absorbing such shocks and jars is fully efficient irrespective of the condition of shaft alinement, and the means for insuring proper driving connection irrespective of conditions of shaft alinement are fully effective throughout movement of parts due to the cushioning action.

Couplings of this general type are especially useful in connection with the transmission of power from the power plant of a motor vehicle to the driven wheels, the coupling then being adapted to receive and absorb jars arising from motor and road conditions and permitting a starting of the drive shaft to overcome the inertia of the load imposed thereon without excessive strain on the coupling parts of other elements of the driveconnection.

The arrangement of parts is preferably such that after the resilient connection has yielded under load to a certain degree, there comes into play a positive drive connection, to obvious advantage.

It may be set forth as among the principal objects of the invention to provide a coupling of the type described generally above that is not only highly efficient in all phases of its operation but is of utmost simplicity and sturdiness, these characteristics being most important both from the standpoint of the cost of manufacture and assembly and by reason of the abusive use to which such devices are often put. It may be noted, however, that while I have referred to the coupling as being especially adaptable as a drive connective unit of a motor vehicle, this is in no way to be considered as limitative, for the coupling may be utilized in any situation where conditions call for this type of connection.

While there have already been provided couplings made up generally of two resiliently connected members aplied one to each of a pair of shafts, one through a rigid joint and the other through a universal pivotal connection, and in certain instances the universal pivotal connection has been in line with the axis of rotation of the rigidly connected shaft, so far as I am aware, wherever the universal pivotal connection has been provided in alinement with such axis of rotation, said connection has been of a ball and socket joint type rather than of a drive connective type. Therefore, as a particular feature of my invention, I have provided a centrally located universal pivotal connection which is also a driving connection between one of the shafts and the member to which it is pivotally connected. By virtue of this arrangement, there is direct drive between said pivotally connected shaft and its member and the necessity for driving elements in addition to the universal pivotal connection is thereby eliminated, to obvious advantage.

The disposition of the pivotal connection at the point indicated makes it possible to locate the drive connective elements of said pivotal connection at the most efficient point, rendering such elements less liable to shear or fail under the tremendous torsional and shearing strains to which they are exposed. Furthermore, the connection which I have devised has inherent characteristics which render it capable of withstanding these torsional stresses and strains with particular efficiency.

I have also provided a joint which calls for a minimum of accurate machining to insure proper elimination of lost motion, and the parts are so relatively arranged and are so fashioned that the joint, per se, may be assembled with ease and by unskilled labor, and attachment made to the drive and driven shafts with ease. In fact, one of the shafts is adapted to be connected with the universal joint prior to the full assembly of said joint, and after the joint has been brought into final assembly, attachment to the other shaft is made merely through cap screws or bolts.

Another very important feature of my device lies in the provision for its efficient lubrication, there being passageways whereby lubricants are carried to all wearing surfaces. The ability so to pass the lubricant without the provision of complicated lubricating devices arises from the general nature of the assembly. It is merely necessary to keep the main compartment of the joint supplied with lubricant, there thus being the necessity for only one lubricating fixture accessible from without the joint, the lubricant passing naturally from this main compartment to all the wearing surfaces.

Other features of novelty and objects of the invention will be made apparent in the following detailed description, reference being had to the accompanying drawings, in which:

Fig. 1 is a side elevation of my joint;

Fig. 2 is a medial, longitudinal section of the joint, slightly enlarged with respect to Fig. 1;

Fig. 3 is a side elevation partly in transverse, medial section, showing a modified means for attaching a flexible boot to the joint;

Fig. 4 is a section on line 4—4 of Fig. 2;

Figs. 7, 8 and 9 being arranged in the relative positions they occupy during assembly.

Figures 5, 6:
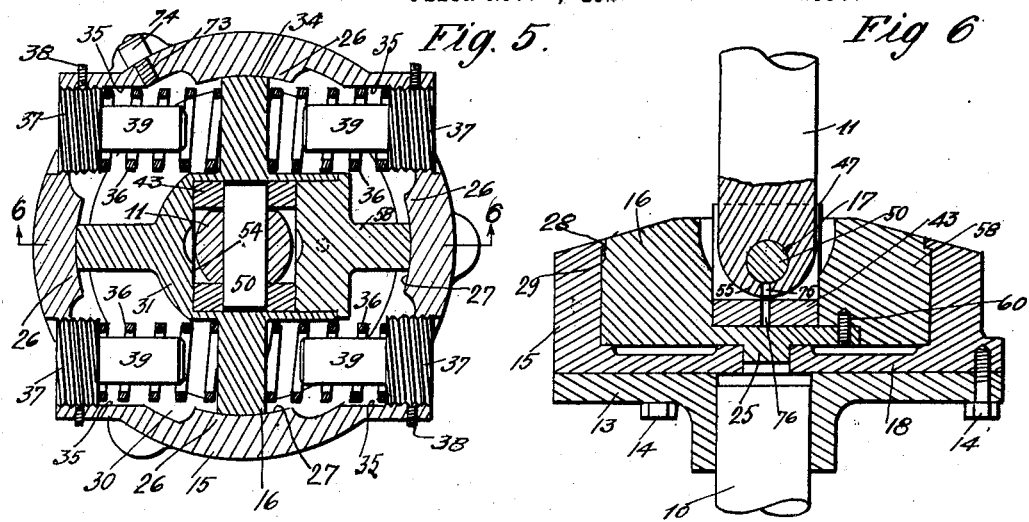
Fig. 5 is a section on line 5—5 of Fig. 2.
Fig. 6 is a section on line 6—6 of Fig. 5.
Figures 7, 8, 9:
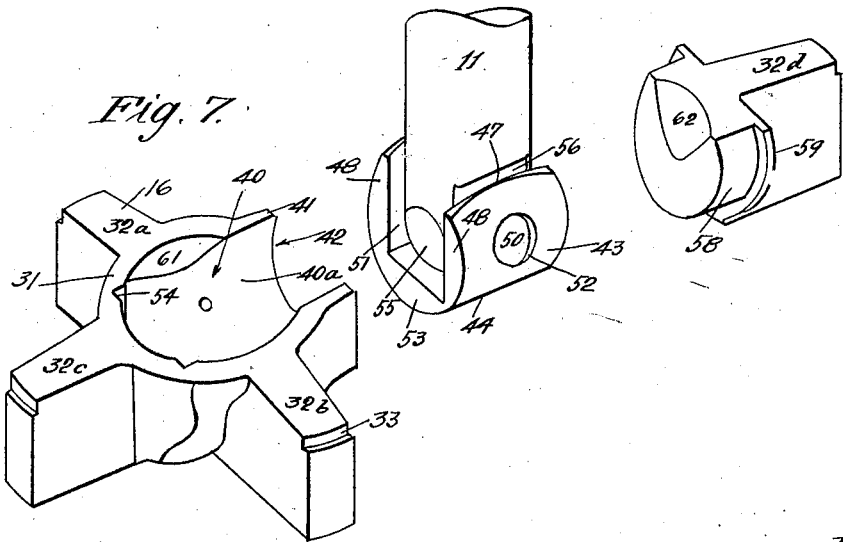
Fig. 7 is a perspective view of the spider member of my joint.
Fig. 8 is a perspective view of the cylindric joint element, with a fragment of one of the shafts applied thereto.
Fig. 9 is a perspective view of the member used for holding the spider of Fig. 7 and the joint element of Fig. 8 releasably in assembly.

In the drawings, numerals 10 and 11 indicate shafts drivingly connected through the coupling generally indicated at 12. Keyed or otherwise suitably secured to shaft 10 is a flange 13 adapted to be secured rigidly by such means as bolts 14 to member 15 of coupling 12. Coupling 12 also includes a member 16 which is capable of limited axial rotation with respect to member 15, as will hereinafter be made apparent, and is connected at 17 to shaft 11 for universal pivotal movement with respect thereto.

The particular means for holding members 15 and 16 against separative movement in the direction of their axes, and the means resiliently connecting these members as regards their relative rotation are not essential to the invention, considered in its broader aspects. However, I will describe the illustrated means with some particularity as they are preferred, and, being novel in themselves, are made the subject-matter of certain claims. An understanding of the preferred embodiment will make it apparent to those skilled in the art how the invention may be applied with advantage to other structural situations without departing from the spirit and scope of my broader claims.

Member 15 may be described as a cup-shaped member, the plate or bottom portion 18 being held to flange 13 by bolts 14 and the marginal, annular flange portion 19 of the cup member defining a substantially annular compartment 20. Plate 18 is preferably annularly relieved at 21, member 16 being adapted to bear against the annular face 22 at one side of the relieved portion, and against the end of central hub 23 which defines the inner extent of the relieved portion. Preferably, though not necessarily, bottom 18 has a central bore 24 extending through hub 23 and adapted to take the axial, alining stub shaft 25 which extends centrally from member 16.

Extending radially inward from flange 19 are the angularly spaced lugs 26, said lugs presenting inward arcuate faces 27 which are concentric with shaft 10, as is also bore 24, and the lugs have overhanging or inwardly extending lips or flanges 28 which present shoulders 29 in opposition to face 22 of bottom 18. The spaces 30 extending angularly between lugs 26 may be termed entrance notches, and are provided for a purpose to be made apparent.

Member 16 is of spider formation, being mounted within member 15 for limiting axial rotation about the extended axis of shaft 10, and is universally pivotally connected at 17 to shaft 11. I will first describe the mounting of member 16 in member 15, though it will be understood this particular mounting, while it is preferable, does not control or limit the invention.

Member 16 includes a central hub portion 31 from which extend a plurality of radial arms or wings 32. Preferably, though not necessarily, there are provided four of these arms or wings, wings $32^a$ and $32^b$ being diametrically opposed, while wings $32^c$ and $32^d$ are diametrically opposed and are spaced substantially 90° from wings $32^a$ and $32^b$. The ends of the wings have angular notches 33 which are substantially complementary to lips 28, and the angular extent of each arm is preferably, though not necessarily, considerably less than the angular extent of the associated lug 26.

In assembling members 15 and 16, member 16 is lowered into compartment 20, wings 32 being passed through notches 30 and shaft 25 being entered in bore 24. The spider is then rotated in one direction or the other to bring wings 32 into alinement with lugs 26 and beneath shoulders 29, face 22 and said shoulders engaging opposite sides of the wings to hold members 15 and 16 against relative movement in the direction of the common axis of rotation A of shaft 10 and member 15. The ends 34 (Fig. 5) of wings 32 are preferably arcuately complementary to lug faces 27, said lugs and wings centering member 16 within member 15, as does also shaft 25 within bore 24.

Entered through apertures 35 in flange 19 are springs 36, the inner ends of said springs being adapted to engage opposite sides of lugs 32$^a$ and 32$^b$. Stop screws or heads 37 are threaded into bores 35 to engage the outer ends of springs 36 and to place said springs under predetermined pressure. The tension of the several springs may be adjusted individually by individual adjustment of the associated screws or heads 37, set screws 38 preferably being provided to hold the individual heads 37 in adjusted positions. Springs 36 thus serve as yieldable connections between members 15 and 16, allowing limited relative rotation therebetween. While the springs themselves may be so proportioned that they positively hold wings 32 from rotating out from beneath shoulders 29, I preferably provide heads 37 with axial shanks 39 which may have the three-fold function of centering the associated springs, limiting the angular movement of member 16 by forming a stop for an opposite wing 32 and thereby preventing said wing from rotating from beneath shoulders 29, and forming a positive drive connection between members 15 and 16 by engagement with wings 32 after a given pair of springs have been compressed a predetermined degree.

In effect, it will be seen that springs 36 serve as yieldable abutments supported by member 15 and adapted yieldingly to resist rotation of member 16 with respect to member 15, while shanks 39 provide adjustable, positive stops or abutments which come into play after springs 36 have yielded to a predetermined extent. Of course, heads 37 may be adjusted individually or collectively to vary the resiliency of the connection between members 15 and 16 to give any desired effect, though ordinarily they will be adjusted in a manner normally to maintain wings 32 centered with respect to the associated lugs 26.

I will now describe the centrally arranged, universal pivotal connection 17 between shaft 11 and member 16, it being noted that this connection acts as a driving connection between shaft 11 and member 16, in all its positions of pivotal movement, and that it is located in alinement both with the axis of rotation A of shaft 10, member 15 and member 16, and with the axis of rotation B of shaft 11. Of course, when shaft 11 is angular with respect to shaft 10, connection 17 lies at the intersection of the projected axes A and B while, when shafts 10 and 11 are in axial alinement, connection 17 lies in the common axis of rotation A—B.

Hub 31 has a central, arcuate recess 40 which is defined by the cylindric bearing face 40$^a$, the axis C of said recess intersecting the axis A, projected, at right angles. The cylindric face 40$^a$ is of an angular extent greater than 180°. The recess 40 extends in the direction of its axis to the end of hub boss 41, it thus being possible easily to machine the recess properly and also providing an entrance mouth 42 whereby the U-shaped, cylindric joint element 43 may be thrust endwise into said recess. Element 43 has an arcuate or cylindric bearing face 44 which is complementary to bearing face 40$^a$, though of a little greater angular extent so the ends 47 of the U-arms 48 extend slightly beyond face 49 of spider 16 when shafts 10 and 11 are in alinement.

A pivot pin 50 extends diametrically through element 43 and across the space 51 between arms 48, preferably, though not necessarily, being held non-rotatably in arm apertures 52 by force-fit, and pin 50 is located midway between the ends of element 43 so when said element is thrust endwise into the recess until inner face 53 engages the end wall 54 of recess 40, said pin 50 lies so its longitudinal axis D intersects axis A, projected; said axis D intersecting axes B and C at right angles.

Shaft 11 has an arcuate end 55 which is flattened at 56 so as to be nicely taken between arms 48, and has a diametrically extending bore 57 whereby the shaft is pivotally mounted on pin 50.

From the above, it will be seen that shaft 11 may be swung pivotally about axis D with respect to element 43, and may be swung pivotally with element 43 about axis C of recess 40, and since axes C and D extend at right angles with respect to one another, shaft 11 is capable of universal pivotal movement with respect to member 16.

As a convenient means for holding element 43 against endwise movement, I provide a cylindric block or plug 58 which is adapted to be taken within mouth 42 to close it, and may carry wing 32$^d$. The plug preferably has a flange 59 engaging the end of boss 41 to limit its inward endwise movement and thereby prevent the plug from being moved into binding engagement with the outer end of element 43. However, said plug is close enough to said end of the element to prevent any appreciable endwise movement of said element and thus serves positively to maintain pin 50 in correct relationship with axis A. Preferably, a set screw 60 is threaded through hub 41 into plug 58 to hold said plug from moving outwardly and into binding relation with the associated lug 26.

Hub 31 is preferably countersunk or relieved at 61 and plug 58 is relieved at 62 to allow an increased extent of angular movement to shaft 11.

Preferably, there is applied a usual flexible boot 63, made of leather or the like, applied to member 15 and engaging shaft 11 in a manner to define a lubricant compartment 64 which is in communication with compartment 20. While the precise nature of this boot and means for attaching it to member 15 are not important to this invention, I have shown a preferred means in Fig. 2. There is here shown a ring 65 secured to the outer end of flange 19 at 66 and having an outwardly extending flange 67 with an annular recess 68 on its outer periphery. The larger end of boot 63 is drawn over flange 67 and clamped into recess 68 as by strap 69. The smaller end 70 of the boot is drawn together about shaft 11.

In Fig. 3 I have shown a variational manner of applying the smaller boot 71$^a$ to member 15. In this case, ring 65$^a$ is secured to member 15 at 66$^a$ and has an inturned annular flange 71 and an out-turned annular flange 67$^a$, the latter having an annular recess 68$^a$ into which the boot is pressed by strap 69, the smaller end of boot 63$^a$ being drawn together about shaft 11. Flange 71 is adapted to ride in annular groove 72 provided in spider face 49, when members 15 and 16 are rotated relatively.

Lubricant is admitted to compartments 20 and 64 through the aperture 73 in flange 19, a suitable lubricant valve 74 preferably being provided. The lubricant thus introduced finds its way to all the wearing parts of the joint. For instance, it works down between member 16 and element 43 and between shaft end 55 and element 43. The passageway 75 drilled through end 55 to bore 57 (Fig. 2) admits lubricant to the bearing face of pin 50, and a passageway 76 in the arm portion of U-element 43 passes lubricant to the cylindric faces 40$^a$ and 44. Lubricant also passes from recess 40 through passageways 77 in member 15 to recess 21 from which it passes between the bearing faces of members 15 and 16, as well as to the bearing face of stub shaft 25.

It will be noted that there is considerable extent of longitudinal bearing between element 43 and member 16 at each side of axis A and that the arms 48 of element 43 have bearing engagement with the flattened sides 56 of shaft 11, which flattened faces extend considerably beyond the center of pin 50. Accordingly, the universal pivotal connection is well adapted to serve as a driving connection between the member 16 and shaft 11, there being no pins exposed to excessive shearing strains as is ordinarily the case with universal pivotal connections where the drive is directly through said connections. It will also be noted that this central disposition of the pivotal connection and the use of the pivotal connection as the sole drive connective means between shaft 11 and member 16 makes it possible to concentrate the structure at the center of the joint 12 and do away with the driving arms usually provided at some little distance from the centers of universal joints. In spite of the sturdy construction of the pivotal connection which permits of it being the drive connection between shaft 11 and member 16, said connection is so compact that it occupies but very little space and consequently reduces the over-all dimensions of the universal to surprisingly small size.

This feature of concentration of parts and compacting of mechanism is also largely contributed to by reason of the fact that pivotal connection 17 and the yieldable connection between members 15 and 16 lie in the same plane.

It will be understood the drawings and description are to be considered merely as illustrative of and not restrictive on the broader claims appended hereto, for various changes in design, structure and arrangement may be made without departing from the spirit and scope of said claims.

I claim:

1. In combination with a pair of shafts, a pair of members, means resiliently connecting said members, means connecting one shaft to one of the members, and means universally pivoting the other shaft to the other of said members, said pivoting means being located substantially in alinement with the axis of said one shaft and providing a driving connection between said other shaft and said other member, said resilient connecting means and said pivoting means lying substantially in the same plane.

2. In a device of the character described, a pair of shafts, a member embodying a plate, and angularly spaced lugs extending angularly from the plate, a second member associated with the plate for rotation with respect thereto, wings on said second member, coacting means on said lugs and wings adapted to hold said second member and plate against separation in the direction of the second member's axis of rotation, springs acting between the members to resist yieldingly such rotation of said second member; a connection between one of the shafts and one of the members, and means universally pivoting the other shaft to the other member.

3. In a device of the character described, a cup-shaped member, angularly spaced shoulders extending radially inward from the flange of the cup-shaped member and spaced from the cup-bottom, a second member mounted for limited axial rotation within the cup-member, and angularly spaced, radial wings on the second member and extending between the cup bottom and said shoulders to hold the cup-member and second member against separation in the direction of the second member's axis of rotation.

4. In a device of the character described, a cup-shaped member, angularly spaced shoulders extending radially inward from the flange of the cup-shaped member and spaced from the cup-bottom, a second member mounted for limited axial rotation within the cup-member, angularly spaced, radial wings on the second member and extending between the cup bottom and said shoulders to hold the cup-member and second member against separation in the direction of the second member's axis of rotation, and springs acting between the cup-member and second member to resist yieldingly axial rotation of said second member.

5. In a device of the character described, a cup-shaped member, angularly spaced shoulders extending radially inward from the flange of the cup-shaped member and spaced from the cup-bottom, a second member mounted for limited axial rotation within the cup-member, angularly spaced, radial wings on the second member and extending between the cup bottom and said shoulders to hold the cup-member and second member against separation in the direction of the second member's axis of rotation and springs acting between the cup-member and second member to resist yieldingly axial rotation of said second member to a position clearing said wings from beneath said shoulders.

6. In a coupling for drivingly connecting a pair of shafts, a pair of members drivingly connected one to each of said shafts, and means holding the members separably in end to end engagement and drivingly connecting them, said means embodying a plurality of radial extensions on one of the members and a plurality of angularly spaced shoulders on the other member adapted to overlie the extensions radially, said extensions being entered beneath the shoulders by moving the members together with the extensions between the shoulders and then rotating one member with respect to the other a predetermined distance, and drive connective means interposed between said extensions and said other member after the extensions are beneath the shoulders, said last-named means allowing but yieldably resisting limited relative rotation of the members and positively preventing relative rotation sufficient to clear the extensions from the shoulders.

7. In a coupling for drivingly connecting a pair of shafts, a member drivingly connected to one shaft near its end, a spider embodying a hub and angularly spaced wings extending radially from the hub, a universal joint connection within the hub between said spider and the other shaft, means holding said member and spider against separative movement in the directions of the shaft axes, and a limitedly yieldable drive connection between said member and said wings.

8. In a coupling for drivingly connecting a pair of shafts, a member drivingly connected to one shaft near its end, a spider embodying a hub having an axial recess opening to one side face thereof and having a transverse way opening to the recess and the outer peripheral face of the hub, a plurality of angularly spaced wings extending radially from the hub, one of said wings being removable and normally closing said way, and a universal joint connection between said spider and the other shaft, said connection being introduced to the recess through said way when said one wing is removed, said one wing being subsequently replaced to close the way and thereby hold the connection from displacement, means holding said member and spider against separative movement in the directions of the shaft axes, and a limitedly yieldable drive connection between said member and said wings.

In witness that I claim the foregoing I have hereunto subscribed my name this 14th day of October, 1926.

JOSEPH TRIULZI.